United States Patent Office 3,376,056
Patented Apr. 2, 1968

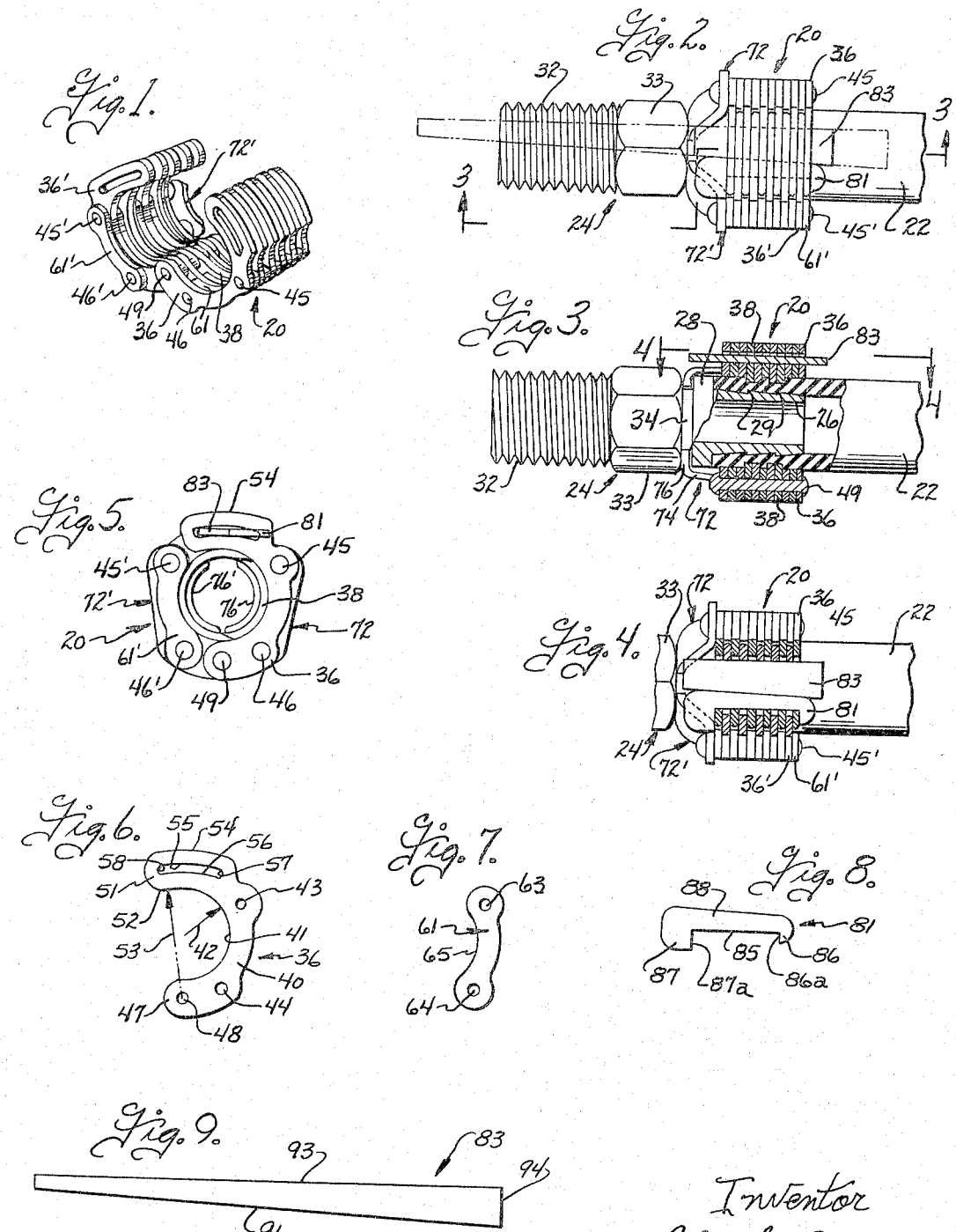

3,376,056
HOSE CLAMP
Robert S. Linstead, 11934 Ventura Blvd.,
Loves Park, Ill. 61111
Filed June 15, 1966, Ser. No. 557,659
11 Claims. (Cl. 285—243)

The present invention relates to hose couplings and more particularly to a coupling for connecting a resilient hose and a tubular insert.

It is an object of this invention to provide a hose coupling which can be economically constructed, is re-usable, and which can be easily and rapidly connected.

Another object is to provide a laminated hose coupling adapted for securely connecting a high-pressure hose and a tubular insert.

Still another object of this invention is to provide a hose coupling which may accommodate hose end sections in slightly varying dimensions.

Yet another object is to provide a hose coupling having internal ribs which encompass the hose and depress therein.

Another object is to provide a hose coupling which provides generally uniform locking action along the entire axial length of the coupling.

A further object of this invention is to provide a hose coupling including two members which are pivotally connected at one side and have uncomplicated connecting means at the other side.

Other objects and advantages of the present invention will become apparent as the same becomes better understood from the following detailed description when taken in conjunction with the accompanying drawings wherein:

FIGURE 1 is a perspective view of an embodiment of the present invention preparatory to connecting;

FIGURE 2 is a top plan view of the embodiment of FIG. 1 operatively connecting a resilient hose and a tubular insert;

FIGURE 3 is a sectional view taken generally along broken line 3—3 of FIG. 2;

FIGURE 4 is a sectional view taken along line 4—4 of FIG. 3;

FIGURE 5 is an end view of the apparatus of FIG. 2 but with the hose and insert removed for better illustration; and FIGURES 6-9 are plan views showing the details of some of the parts of the present invention.

Reference is now made more particularly to the drawings wherein similar reference characters indicate the same parts throughout the several views.

The hose coupling of the present invention, generally designated 20, is particularly adaptable for connecting a resilient hose 22 and a tubular insert 24. The hose may be of any convenient construction suitable for its purpose and may be fabricated of resilient rubber or synthetic resin. When the present invention is utilized in a high pressure system, the hose may be reinforced (not shown) as by a fabric or wire which may be embedded within the various layers of the fabricated hose. The coupling as contemplated by the present invention requires no preparation of the hose end prior to assembly and is arranged to accommodate slightly varying diameters of the hose. The tubular insert 24 includes a stem 26 which is inserted within the hose until the end abuts against a collar 28 of the stem, as shown in FIG. 3. The stem is advantageously provided with circumferential serrations 29 extending around the stem. As hereafter described, as the coupling is forced around the hose end, the hose is deformed to generally fill the space between the stem and the coupling assembly and because of the improved holding action along the entire axial length thereof, the end portion of the resilient hose is not damaged by its use, and all parts of the coupling assembly may be re-used after removal. The tubular insert is conveniently provided with a threaded end portion 32 and a wrench-engaging surface 33. Immediately between the collar and surface 33 of the stem is an inwardly extending annular recess 34 for a purpose which will hereinafter become apparent.

The preferred embodiment of the present invention includes left and right hand laminated members pivotally connected along one longitudinal side thereof. Generally, each member includes a plurality of arcuate pieces and a plurality of spacers laminated in staggered relationship. Preferably, the pieces to be laminated are metal stampings with the arcuate pieces being of substantially equal thickness and the spacers of slightly greater thickness for a purpose which will hereinafter become apparent. By way of illustration, I advantageously use a #16 gauge stock for the arcuate pieces and a #14 gauge for the spacers.

The preferred embodiment illustrated in the drawings includes standard arcuate pieces, generally designated 36, and ribbed arcuate pieces, generally designated 38. The standard arcuate piece, illustrated in detail in FIG. 6, includes an intermediate portion 40 having a substantially semicircular inner edge 41 at a radius 42 approximately equal to the radius of hose 22. The intermediate portion is provided with openings 43 and 44 for passage of fasteners in the form of rivets 45 and 46, respectively (FIG. 5). A lower end portion 47 extends slightly beyond the intermediate portion to provide an opening 48 to accommodate a pivotal connection in the form of hinge pin 49. An upper end portion 51 extends beyond the intermediate portion and has an inner edge 52 preferably at a radial distance 53 from the center of opening 48. The upper edge 54 is also conveniently a radial distance from the center of opening 48 to provide a smooth upper surface of the coupling when locked in operative position as best shown in FIG. 5. An arcuate slot is provided at the upper end portion and advantageously extends a distance into the intermediate portion as best illustrated in FIG. 6. The slot defines ends 57, 58 and sides 55, 56 which are advantageously a radial distance from the center of opening 48. Ribbed arcuate piece 38 is identical to regular arcuate piece 36 with the exception that the inner edge thereof is disposed inwardly from the inner edges 41 and 52 whereby, when such a ribbed arcuate piece is included in the laminated member, it defines a circumferentially extending rib on the inner surface of the member. In the preferred embodiment of the invention, there is at least one such rib in each left-hand and right-hand member, and the rib is adjacent the rib of the opposite member. In this manner, when the coupling is secured in operative position, the rib ends circumferentially overlap, thereby encircling the resilient hose and depressing therein (FIG. 3).

A preferred form of spacer 61 is shown in detail in FIG. 7. In general, the spacer is in the shape of a part of intermediate portion 40 of regular arcuate member 36. The spacer is provided with openings 63, 64 which are aligned with openings 43, 44 when in laminated relationship. Likewise, inner edge 65 has the same radius as inner edge 41 and is aligned therewith when in laminated relationship. Preferably, each left and right-hand member has a plurality of arcuate pieces and a plurality of spacers, alternately, and laminated by rivets 45 and 46. The spacers have a thickness at least as thick as the arcuate pieces and preferably slightly thicker whereby the pivotal connection provided by pin 49 provides a free pivotal connection caused by the slight additional tolerance between the meshed lower ends 47 of the left and right-hand arcuate pieces. This slight tolerance also provides for ease in meshing of the upper ends of the arcuate pieces when being assembled on a hose and tubular insert. To additionally aid in this operation, however, the outer ends of the upper end portion are advantageously chamfered or coined slightly as illustrated in FIGS. 2 and 4.

An annular flange, generally designated 72, is advantageously provided at one end of each member for engaging the annular recess 34 (see FIG. 3) to hold the insert in position. While the annular flange may be otherwise secured to the member, it is conveniently provided with openings for passage of rivets 45 and 46 to aid in the economics of construction. The annular flange includes an intermediate portion 74 overlying collar 28 and an inwardly projecting end portion 76 disposed in the annular recess 34. Thus, the annular flange has a general shape corresponding to a portion of the stem. Examination of the relative dimensions illustrated in FIG. 3 illustrates that the intermediate portion 74 which accommodates the collar 28 is of a greater distance axially than the width of the collar. Additionally, the end portion 76 has a width less than the width of annular recess 34. Thus, the insert may move relative to the hose coupling a short distance in an axial direction. Further examination will reveal that the radial dimension of the collar 28 and recess 34 is less than the radius of the corresponding surfaces of the annular flange 72. Thus, there is a minor amount of axial and radial difference between the dimensions of the tubular insert and the annular flange. In this manner, the annular flange 72 is shaped to accommodate minor variations in the size of insert 24 and slight differences in the dimension of the hose end portion are automatically accommodated by a self-centering action of the insert within the hose coupling. At the same time, by virtue of the compressive action of the ribs against the resilient hose member, and corresponding pressure against stem 26 of the insert, an extremely tight and positive gripping action of the complete assembly is obtained. Preferably, as best shown in FIG. 3, there is a pair of ribbed arcuate members 38 for each serration 29 and each pair is disposed in an area overlying one serration 29 so that the resilient hose is compressed and deformed to generally fill the space between the stem and coupling.

As stated above, the members are constructed of metal stampings laminated together. As such, individual pieces can easily be fabricated of different thicknesses, for example the spacers 61 are thicker than the arcuate pieces, and the individual pieces can be constructed of different materials or materials having different strengths. For example, it has been found that it is desirable to temper the ribbed arcuate pieces 38 and the annular flanges 72 for some high pressure uses. In the combination of the present invention this can be done prior to lamination and the other pieces are not tempered, thereby aiding in the economics of construction. The lamination, pivotal connection and final assembly can be performed by a relatively unskilled laborer to keep costs at a minimum.

The left and right-hand members are compressed against the hose and held by connecting means extending through the aligned slots in the left and right-hand members. From the above description it is deemed obvious that the ends of the slots of each member are substantially aligned. The connecting means is in the form of a pair of wedges or keys illustrated in detail in FIGS. 8 and 9 and including a flanged key, generally designated 81, and an elongate key, generally designated 83. Flanged key 81 has a longitudinal extending edge 85 for engaging the aligned outer ends 58 of the slots in one of said right or left-hand members. Flanges 86 and 87 extend laterally from the edge 85 for overlying the outer ends of the arcuate members to further restrain them against axial pressures and the edges 86a, 87a are advantageously perpendicular to edge 85 for this purpose. Flange 86 at the narrower end of key 81 also serves to hold the key means in position when the other key 83 is tightened or wedged. The opposite edge 88 is tapered or inclined with respect to edge 85 to provide the wedging action as hereinafter explained. The elongate key 83 is inclined complementary to the taper of edge 88 on key 81. In this manner, one edge 91 may engage edge 88 with assurance that the outer edge 93 is substantially parallel to edge 85. From the above description it is deemed apparent that the other edge 93 will engage the generally aligned outer ends 58 of the member opposite from the member engaged by edge 85. After insertion, tightening is accomplished by force applied to end 94 of key 83. In this manner, a wedging action is accomplished along substantially parallel lines and a generally uniform tightening is accomplished along the axial length of the coupling. It is deemed obvious that key 83 is reversible and that edge 93 may engage edge 88 of key 81, if desired. When the tightening or locking action is completed, elongate key 83 may be trimmed to a convenient length as illustrated in FIG. 2. It is also deemed obvious that the wedging may be accomplished from either end of the coupling and is not limited to the direction illustrated in the drawings. In this manner, the coupling has greater utility in that the wedging action can be accomplished in tight areas where the elongate key 83 could not be tightened conveniently from the direction illustrated. Obviously, key 83 may be removed by force applied in the opposite direction, thereby allowing the hose coupling to be removed, and it is deemed apparent that the parts of the coupling are readily reusable if desired.

While a preferred embodiment of the invention has herein been illustrated and described, this has been done by way of illustration and not limitation, and the invention should not be limited except as required by the appended claims.

What is claimed is:

1. A hose coupling for connecting to an end portion of a resilient hose, the coupling comprising: a tubular insert adapted to fit in the end portion of the hose, first and second members adapted to engage the outer surface of the end portion of the hose and each including a plurality of arcuate pieces and a plurality of spacers laminated in staggered relationship, the arcuate pieces being of generally equal thickness and each including an intermediate portion having a substantially semicircular inner edge, each arcuate piece having end portions extending beyond the intermediate portion and a slot at one end portion in substantial axial alignment with the slots in other arcuate pieces of the respective member, at least one arcuate piece of each member defining a circumferentially extending rib on the inner surface of the member and adapted to deform the hose when in assembled position said spacers on each member being intermediate the ends of the arcuate pieces and having a thickness at least as thick as the arcuate pieces whereby the ends of the arcuate pieces may be interposed between the ends of the other member arcuate pieces and with the slots in registry, first means disposed in said slots for connecting the first and second members, and second means at the other end of the arcuate pieces for connecting the first and second members.

2. A hose coupling as set forth in claim 1 wherein the rib on the first member is closely adjacent the rib on the second member, and the rib ends circumferentially overlap thereby encircling the resilient hose.

3. A hose coupling as set forth in claim 1 wherein the registered slots have opposite ends in generally parallel relationship, and the first means includes first and second key means having sides tapered complementary to each other and insertable in the slots, said key means engaging the generally parallel slot ends and the inclined sides of each other to force the members into a tightly encompassing relation around the resilient hose.

4. A hose coupling as set forth in claim 3 wherein the rib on the first member is closely adjacent the rib on the second member, the rib ends circumferentially overlap thereby encircling the resilient hose, the tubular insert has circumferentially extending serrations on the outer surface thereof, and said serrations and ribs are arranged so that the resilient hose is deformed and fills the recess between the ribs and serrations when the key means is tightened.

5. A hose coupling as set forth in claim 3 wherein said key means have a length greater than the length of said members, and one of key means includes a laterally extending flange at its narrower end for engaging the end arcuate piece and holding the key means in position when the other key means is tightened.

6. A hose coupling as set forth in claim 1 wherein a portion of the tubular insert extends beyond the hose end, and wherein the exposed portion of the insert has an annular recess, and including: an annular flange on each first and second member at one end thereof and projecting inwardly from the members for engaging the annular recess of the insert to hold the insert in position.

7. A hose coupling as set forth in claim 6 wherein the registered slots have opposite ends in generally parallel relationship, and the first means includes first and second keys insertable in the slots and having a length greater than the length of said members and sides tapered complementary to each other, one of the keys having a laterally extending flange at each end and extending in a direction opposite its inclined side for overlying the arcuate piece at each end.

8. A hose coupling as set forth in claim 6 wherein the arcuate pieces, spacers, and annular flanges are metal stampings; the spacers have a thickness slightly greater than the thickness of the arcuate pieces; and at least the annular flanges and the arcuate pieces defining the circumferentially extending ribs are tempered to increase the strength thereof.

9. A hose coupling for connecting to an end portion of a resilient hose, the coupling comprising: a tubular insert adapted to fit in the end portion of the hose, a plurality of U-shaped pieces having a substantially semicircular inner edge and end portions extending therebeyond, means for pivotally connecting the U-shaped pieces at one end thereof with every other U-shaped piece oppositely facing thereby forming left and right-hand sections which may be pivoted to encompass the end portion of the resilient hose, each section having a plurality of similarly facing U-shaped pieces, at least one U-shaped piece in each section having an inner edge disposed inwardly from the inner edge of the other U-shaped pieces of the section to define a rib, the other end of each U-shaped piece having a slot therein, said slots arranged in registry when the sections encompass the resilient hose, and first and second means disposed in the slots for forcing the sections into a tightly encompassing relation around the resilient hose with the ribs depressing therein.

10. A hose coupling as set forth in claim 9 wherein the slots are arcuate and substantially the same size and arranged a generally equal radial distance from the pivotal connection.

11. A hose coupling as set forth in claim 10 wherein a portion of the tubular insert extends beyond the hose end, and wherein the exposed portion of the insert has an annular recess, and including: a spacer disposed betweeen the adjacent U-shaped pieces of each section and having an arcuate inner edge, an annular flange on each section at one end thereof and projecting inwardly from the members for engaging the annular recess of the insert to hold the insert in position, and means for laminating the U-shaped pieces, spacers, and annular flanges of each section to form a unitary section; and wherein the first and second means comprises first and second keys having complementary tapered sides for generally uniformly tightening the sections around the resilient hose.

References Cited

UNITED STATES PATENTS

| | | | |
|---|---|---|---|
| 442,121 | 12/1890 | Jackson | 285—253 |
| 1,026,211 | 5/1912 | Kissinger | 285—420 X |
| 2,911,239 | 11/1959 | Marzolf | 285—415 |
| 3,181,900 | 5/1965 | Hayward | 285—421 X |

EDWARD C. ALLEN, *Primary Examiner.*

CARL W. TOMLIN, THOMAS F. CALLAGHAN,
*Examiners.*